UNITED STATES PATENT OFFICE.

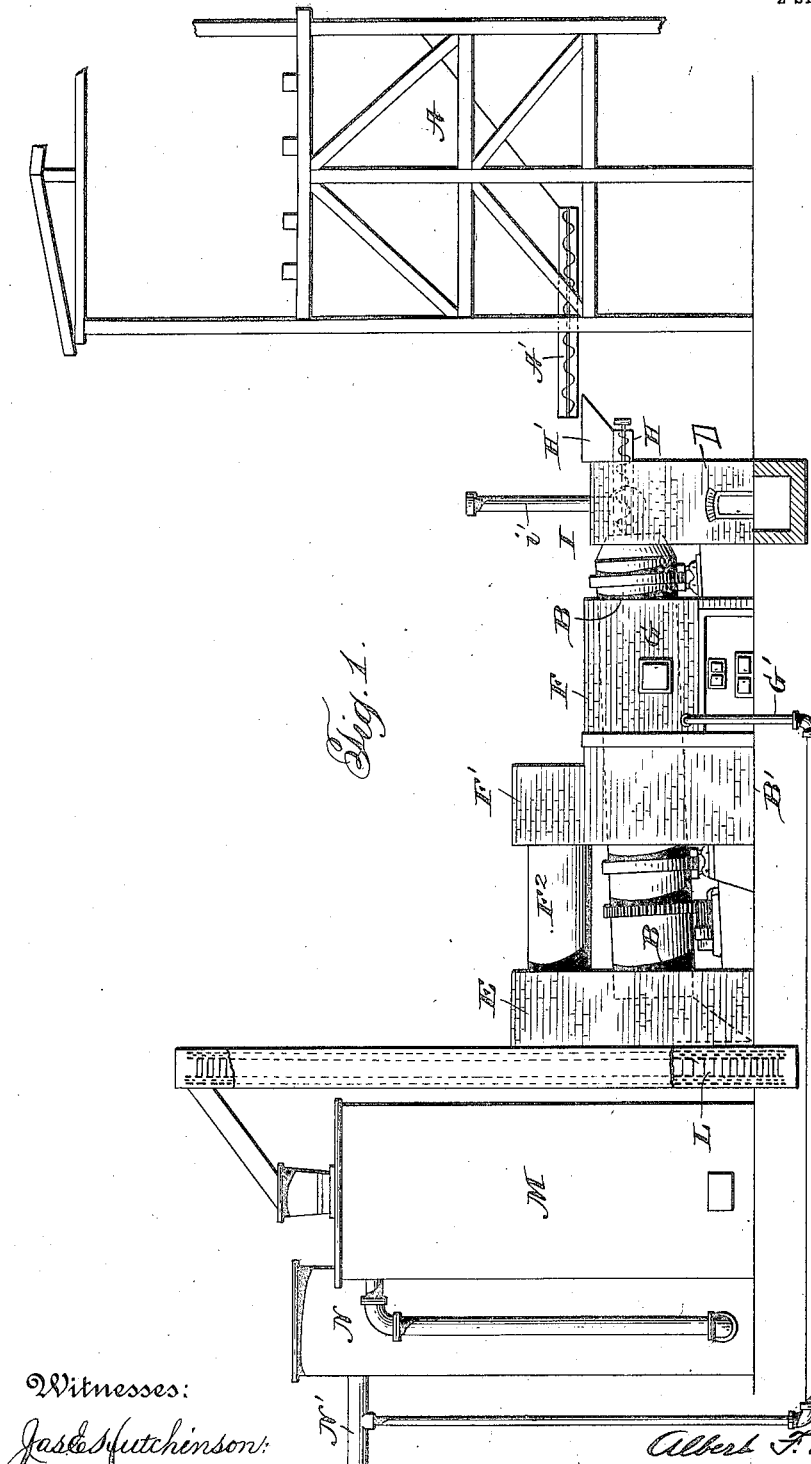

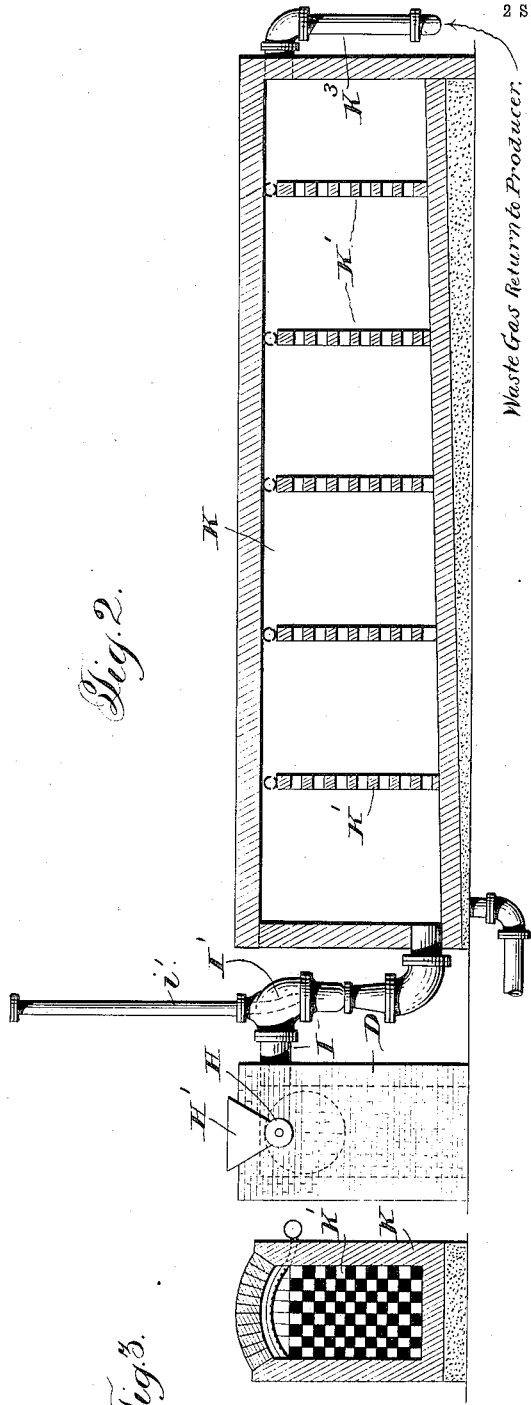

ALBERT F. MATLACK, OF PHILADELPHIA, PENNSYLVANIA, ASSIGNOR TO SEWAGE & GARBAGE POWER CO., A CORPORATION OF MAINE.

METHOD OF TREATING GARBAGE AND SEWAGE SLUDGE.

1,102,532. Specification of Letters Patent. Patented July 7, 1914.

Application filed June 9, 1911. Serial No. 632,280.

*To all whom it may concern:*

Be it known that I, ALBERT F. MATLACK, citizen of the United States, residing at Philadelphia, in the county of Philadelphia and State of Pennsylvania, have invented certain new and useful Improvements in Methods of Treating Garbage and Sewage Sludge, of which the following is a specification, reference being had therein to the accompanying drawing.

This invention relates to an improved method for treating sewage and garbage, and is in part a division of my application filed March 29, 1911, Serial Number 617,548 for improvements in method and apparatus for treating sewage and garbage.

The object of the present invention is the provision of a method of treating sewage and garbage so as to utilize every part thereof and to recover all of the valuable by-products of the material.

In the accompanying drawings, wherein there is illustrated one form of apparatus with which the improved method may be carried out, Figure 1 is a side elevation of an apparatus for the treatment of sewage and garbage in accordance with the present method; Fig. 2 is an end view thereof, the condensing chamber being shown in elevation; Fig. 3 is a cross section of the condensing chamber.

In the treatment of sewage by precipitation in settling tanks, great difficulty has been experienced in utilizing or getting rid of the material which collects in the settling basin and which is known as sewage sludge, and likewise difficulty has been experienced in utilizing and disposing of the solid material which remains after the rendering process which is used in treating garbage has been carried out, which material is known as garbage pulp. The present invention has to do with the treatment of these two materials, namely, sewage sludge and garbage pulp, and with the utilization of practically all of such material, and the recovery therefrom of all of the valuable by-products thereof.

Broadly stated, the present method of treatment consists in subjecting the sewage sludge and garbage pulp to treatment in a retort to distil off therefrom gases which, when condensed, will give up ammonia and grease, and burning the resultant solid in a gas producer to obtain therefrom a gas which may be used for fuel or other purposes, and an ash which may be used as a fertilizer. The material is thus first subjected to an initial heat of low temperature which is applied to the exterior of the retort, and is subsequently directly subjected to a very high temperature in the gas producer.

Referring now more particularly to the form of apparatus disclosed in the drawings, wherein like characters of reference refer to similar parts in the several views, A designates a storage bin of any suitable type in which is maintained a supply of sewage sludge and garbage pulp. The material in the bin A is fed therefrom through the medium of a screw conveyer A' which is positioned in a suitable trough at the bottom of the bin A and which may be of any desired construction and may be driven in any desired manner.

B designates an elongated rotary cylinder or still which is rotatably supported on bearings of any suitable construction secured to a base B' and is adapted to be rotated in any suitable manner. The cylinder or still B is inclined slightly from the inlet to the outlet end thereof and the inlet end extends into one side of a closed flue or chamber D while the outlet end thereof extends into one side of a closed flue or chamber E so that the interior of such still is closed to the atmosphere. Surrounding the forward and central portion of the cylinder or still B is a furnace F from the upper portion of which extends an outlet flue F' which is connected by means of a horizontal flue F² with the upper portion of the flue or chamber E heretofore referred to. The furnace F is provided with a fire box of any suitable construction and I prefer to dispose within such fire box a burner or burners G for heating the exterior of the forward portion of the cylinder or still B, such burner being supplied with fuel through a supply pipe G'. Material is supplied to the interior of the rotary cylinder or still B through a feed trough H which extends through the chamber or flue D and the rear end of which projects into the forward end of the rotary cylinder or still B, and in which trough a suitable screw conveyer H operates. The portion of the trough H without the flue of the chamber D is provided with a feed hopper H' which is positioned to receive the material discharged from the feed trough A' which extends from the lower portion of the bin A. Communicating with the upper portion of the flue or chamber D is a pipe I which projects into one end of a condensing chamber K and positioned within the pipe I is an aspirator I', to which steam is supplied through a supply pipe $i''$, and which serves to draw the gases from the interior of the rotary cylinder or still B into the condenser, as will be hereinafter more particularly set forth. While any desired form of condenser may be used for condensing the gases which are drawn from the cylinder or still B, I have illustrated in the drawings a convenient form of apparatus for this purpose, the condensing chamber in this instance being provided throughout its length with a plurality of transversely disposed baffle walls which are formed of checker brick and which serve to retard the flow of the gases through the condenser so as to give ample time for the condensation thereof to take place. Positioned upon the top of each of the baffle walls K' and extending transversely of the condensing chamber are a plurality of water distributing pipes which are provided with suitable perforations therein so as to permit water to flow therefrom over both faces of the baffle walls K', so that the gases will be forced to contact with the condensed streams of water during their passage through the openings in the baffle walls and thus be condensed. The discharge end of the condensing chamber is provided with a suitable outlet $K^3$ which serves to carry off any uncondensed gases.

The solid materials which pass from the rotary cylinder or still are discharged into the chamber or flue E and through the door in one side thereof into the hopper of a suitable elevator L by means of which they may be, as desired, fed into the feed hopper of a gas producer M.

I have deemed it unnecessary to illustrate the construction of the gas producer M, as any of the well known commercial producers may be used. In practice, however, I prefer to use a producer of the type shown in my application filed May 2, 1910, Serial No. 558,839. From the producer M a gas outlet pipe leads to a suitable gas scrubber N which may be of any well known construction and from which leads a supply pipe N' through which the gas is conducted to any desired point for use. I prefer to extend a branch from the gas outlet pipe N' to the burner supply pipe G' in order that the gas which is recovered from the residue of the rotary cylinder or still may be utilized to heat such cylinder or still. Of course, in starting the device, it will be necessary to initially apply heat to the rotary cylinder or still until the device has been in operation some time.

In carrying out the method, the rotary still B and the conveyers for feeding the material to be treated are driven at such a speed that the material will feed continuously through the still and will be deprived of all its volatile constituents during its passage therethrough which will depend in a measure upon the size of the still, the pitch or inclination thereof, and the amount of material fed thereto. On account of the length of the rotary cylinder or still and the manner of applying heat to the exterior thereof, the interior of said still is divided into a number of zones of different temperatures, and at each revolution the mass travels into a zone of higher temperature. At the beginning, ammonia and grease are disassociated from the mass due to the absorption and production of steam and as the mass is fed further into the rotary cylinder or still and subjected to a higher temperature, the moisture is eliminated and a change from steam and vapor takes place, this substance assuming a lighter form of gas, which when freed will naturally follow the course of the draft and be brought into contact with the steam produced from the constant feed of fresh matter and combine therewith and pass into the condensing chamber by reason of the suction produced by the aspirator I'. The steam and gases when discharged by the aspirator in the condensing chamber are delivered with great force onto the first baffle wall which serves to break up the gases, the heavier particles being forced against the wall and into the streams of water passing over the baffle walls which causes them to fall to the bottom of the condensing chamber, while the lighter portions of the mixture are forced through the openings of the baffle wall and undergo the same treatment when they contact with the second baffle wall. During the passage of the gases through the condensing chamber, all of the valuable by-products carried thereby will be precipitated, the grease floating on the surface of the liquid in the condensing chamber, and the ammonia forming salts. From time to time the liquid in the condensing chamber is drawn off in the precipitating vats and the by-products recovered therefrom. In the condensation treatment above described, there is a white residual gas which forms and which passes through the outlet $K^3$ heretofore referred to. This outlet is conveniently connected to the gas producer M so that these gases will pass into the producer and be consumed therein. I have found that by following this procedure, and consuming these gases in the producer, that the chemical and commercial value of the ash from the producer as a fertilizer is enhanced. It will also be seen that when this course is followed all of the gases which are evolved from the material under treatment are utilized.

The solid matter which passes from the cylinder or still is in the form of decomposed vegetation in a low form of carbon containing tar and held together by the lime contents. Difficulty has heretofore been experienced when attempts have been made to use low carbon fuels rich in tar in gas producers as when fuels of this character are treated in the producer, the fuel tar combines with hydrogen and forms an emulsion which resists all forms of treatment. By the preliminary treatment of the sewage sludge and garbage pulp in a still in the manner heretofore described to recover therefrom their valuable by-products, I have discovered that the resultant solid can be successfully used as fuel in a gas producer. When treated in the producer these solids are unaffected until the temperature of about 1470° F. when the lime decomposes and the carbon dioxid ($CO_2$) reversibly reacts in the presence of carbon and forms carbon monoxid (CO) and at about 1857° F. develops two products, carbon monoxid and fertilizers from the ash.

It will be noted that the products of combustion from the furnace F escape through the outlet flue F' of such furnace, the transverse flue $F^2$ and into the chamber E from whence they will pass into and through the rotary cylinder or still and be discharged by the aspirator into the condensing chamber with the gases from the rotary cylinder or still. As the gas which is burned in the burners is that which has been obtained from the residue of the matter under treatment, it will be evident that not only does this gas contain carbon monoxid values, but also it contains the balance of any of the substances that may have remained in the material after passing through the still. The combustion of the gases under the still is imperfect and hence there is a percentage of matter wasted, but by bringing these gases while they are at a combining temperature into the rotary cylinder or still and in contact with the gases as they are distilled off from the material in said still so that the combination of matter in these gases will be instantaneous, any values contained in the products of combustion will be recovered. Another advantage in returning the products of combustion through the still is that it serves to make the discharge end of the still hottest so as to discharge the material in the driest possible condition, which is highly desirable in order to prevent the formation of emulsion in the gas producer.

An important feature of the present method is the two heat treatments to which the material is subjected. In the first place the material is initially subjected to a low temperature and it is absolutely essential that in this stage of the treatment the heat be applied to the exterior of the retort or container for the material so as to prevent the fire coming in direct contact with the green material. In the second stage of treatment the material which has thus been treated is directly subjected to a very high temperature in the gas producer so as to resolve such material into a gas and an ash which may be used as a fertilizer.

I claim:—

1. The method of treating garbage and sewage sludge consisting in feeding the sludge into a still and subjecting the exterior of the still to heat of a low temperature to drive off the volatile matters from the sludge without burning the solid matters, conducting the gases driven off from the still to a condensing chamber and treating the residual solid matters in a gas producer to convert the same into a combustible gas and a fertilizer.

2. The method of treating garbage and sewage sludge consisting in feeding the sludge into a still closed to the atmosphere, subjecting the solid in the still to heat of a low temperature to drive off the volatile matters from the material without burning the solid matter, condensing the volatile gases driven off from the material, separating the by-products contained in the condensation, and treating the solid residue from the still in a gas producer.

3. The method of treating garbage and sewage sludge consisting in initially subjecting the sludge to a low temperature to drive off the volatile matters therefrom, and subjecting the resultant product to treatment in a gas producer to convert the same into combustible gas and an ash.

4. The method of treating garbage and sewage sludge consisting in feeding the sludge to a continuously rotating container, subjecting the exterior of the container to heat at a low temperature to drive off the volatile matters from the material therein without burning the solid matters, and burning the resultant material in a gas producer to resolve it into a combustible gas and an ash.

5. The method of treating garbage and sewage sludge consisting in initially subjecting the sludge to a low temperature to drive off the volatile matters therefrom, conducting the volatile matters thus driven off to a condensing chamber, leading off the uncondensed gases from the condensing chamber, and treating the residual solid matters in a gas producer to convert the same into combustible gas and a fertilizer.

6. The method of treating garbage and sewage sludge, consisting in heating the sludge in a still to drive off the volatile matters therefrom, conducting the gases driven off from the still to a condenser, and burning the residual solid matter from the still and the uncondensed gases from the condenser in a gas producer.

7. The method of treating garbage and sewage sludge consisting in feeding the sludge into a still and applying heat to the exterior of the still to drive off the volatile matters from the sludge, conducting the gases driven off from the still to a condensing chamber and burning the residual solid matters from the still and the uncondensed gases from the condensing chamber in a gas producer.

In testimony whereof I affix my signature in presence of two witnesses.

ALBERT F. MATLACK.

Witnesses:
E. M. SEARCH,
M. E. HAMER.